(12) United States Patent
Matsumoto

(10) Patent No.: US 12,202,298 B2
(45) Date of Patent: Jan. 21, 2025

(54) PNEUMATIC TIRE

(71) Applicant: The Yokohama Rubber Co., LTD., Tokyo (JP)

(72) Inventor: Kenichi Matsumoto, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 762 days.

(21) Appl. No.: 17/260,209

(22) PCT Filed: Jun. 25, 2019

(86) PCT No.: PCT/JP2019/025076
§ 371 (c)(1),
(2) Date: Jan. 13, 2021

(87) PCT Pub. No.: WO2020/012947
PCT Pub. Date: Jan. 16, 2020

(65) Prior Publication Data
US 2021/0268841 A1 Sep. 2, 2021

(30) Foreign Application Priority Data
Jul. 13, 2018 (JP) .................................. 2018-133672

(51) Int. Cl.
*B60C 11/03* (2006.01)
*B60C 11/12* (2006.01)

(52) U.S. Cl.
CPC ...... *B60C 11/0304* (2013.01); *B60C 11/1236* (2013.01); *B60C 11/1263* (2013.01);
(Continued)

(58) Field of Classification Search
CPC ............. B60C 11/0304; B60C 11/1236; B60C 2011/0348; B60C 2011/0381; B60C 2011/0383
See application file for complete search history.

(56) References Cited

U.S. PATENT DOCUMENTS

2009/0255614 A1 10/2009 Ebiko
2012/0285592 A1* 11/2012 Kameda ................ B60C 11/033
152/209.8
(Continued)

FOREIGN PATENT DOCUMENTS

CN   105644274   6/2016
CN   106132729   11/2016
(Continued)

OTHER PUBLICATIONS

Suzuki, English Machine Translation of JP 2015134581, 2015 (Year: 2015).*

(Continued)

*Primary Examiner* — Justin R Fischer
*Assistant Examiner* — Brendon Charles Darby
(74) *Attorney, Agent, or Firm* — Thorpe North & Western

(57) ABSTRACT

In a tread pattern of a tire, a main groove side of a shoulder lug groove in a side of a first circumferential main groove inclines with respect to the width direction. In each of first intermediate lug grooves and inner lug grooves, a direction from one side toward the other side in the width direction is inclined to a side identical to a side to which the main groove side is inclined. The first intermediate lug grooves overlap with extension lines of each of the shoulder lug grooves extending from a closed end of each of the shoulder lug grooves along an inclination direction of the main groove side toward each of closed ends of the inner lug grooves. A second intermediate lug groove extends between two of the extension lines adjacent in the circumferential direction, in a direction along the extension lines.

20 Claims, 8 Drawing Sheets

(52) U.S. Cl.
CPC .......... *B60C 2011/0348* (2013.01); *B60C 2011/0372* (2013.01); *B60C 2011/0381* (2013.01); *B60C 2011/0383* (2013.01)

(56) References Cited

U.S. PATENT DOCUMENTS

| | | | |
|---|---|---|---|
| 2014/0305559 A1* | 10/2014 | Takemoto | B60C 11/12 152/209.8 |
| 2016/0144665 A1 | 5/2016 | Koishikawa | |
| 2016/0152092 A1 | 6/2016 | Rubber | |
| 2016/0193886 A1 | 7/2016 | Rubber | |
| 2016/0375728 A1 | 12/2016 | Rubber | |
| 2017/0368888 A1 | 12/2017 | Wakasugi et al. | |
| 2018/0207993 A1 | 7/2018 | Rubber | |
| 2020/0148008 A1 | 5/2020 | Nemoto | |

FOREIGN PATENT DOCUMENTS

| | | |
|---|---|---|
| CN | 107709048 | 2/2018 |
| DE | 11 2014 003 255 T5 | 3/2016 |
| DE | 11 2018 003 121 T5 | 3/2020 |
| EP | 3 260 309 A1 | 12/2017 |
| JP | 2009-248961 | 10/2009 |
| JP | 2010126076 A * | 6/2010 |
| JP | 2015134581 A * | 7/2015 |
| JP | 2016-101804 | 6/2016 |
| JP | 2016-113003 | 6/2016 |
| JP | 2017-013672 | 1/2017 |
| WO | WO 2015/037464 | 3/2015 |
| WO | WO 2015/079858 | 6/2015 |
| WO | WO 2015/145910 | 10/2015 |
| WO | WO 2017/018161 | 2/2017 |

OTHER PUBLICATIONS

Suzuki, English Machine Translation of JP 2010126076, 2010 (Year: 2010).*
International Search Report for International Application No. PCT/JP2019/025076 dated Aug. 20, 2019, 4 pages, Japan.

* cited by examiner

PNEUMATIC TIRE

FIELD OF THE TECHNOLOGY

The present technology relates to a pneumatic tire.

BACKGROUND OF THE TECHNOLOGY

To improve the wet performance of a pneumatic tire, it is known to provide a main groove extending in the tire circumferential direction and also a lug groove extending in the tire width direction in a tread surface of the tire to ensure drainage properties. However, when the lug groove has large groove volume, there is a problem of loud popping sound generated during kickoff, and degradation of performance that reduces tire noise (hereinafter referred to as noise performance).

In the related art, in a tire including a main groove and a lug groove, there is known a tread pattern in which one end of the lug groove is connected to the main groove, and the other end is closed within a region of a land portion (see Japan Unexamined Patent Publication No. 2017-13672).

According to a lug groove including one end connected to a main groove and the other end closed within a region of a land portion, it is considered that drainage properties can be ensured to some extent, and degradation of noise performance can be suppressed as compared to a lug groove including both ends connected to a main groove. However, there is a demand to improve the noise performance of a tire at a higher level.

SUMMARY

The present technology provides a pneumatic tire that provides improved noise performance as compared to in the related art while suppressing a decrease of wet performance.

An aspect of the present technology is a pneumatic tire including a tread pattern in a tread portion.

The tread pattern includes at least three circumferential main grooves extending in a tire circumferential direction at intervals from each other,
- a plurality of shoulder lug grooves located in an outer side in a tire width direction of a first circumferential main groove located outermost in the tire width direction of the at least three circumferential main grooves, the shoulder lug grooves being provided in a region of a shoulder land portion in which a ground contact edge in the tire width direction is located, the shoulder lug grooves extending from the outer side in the tire width direction toward the first circumferential main groove and being closed without reaching the first circumferential main groove, the shoulder lug grooves being disposed at intervals in the tire circumferential direction,
- a plurality of first intermediate lug grooves provided in a region of an intermediate land portion between the first circumferential main groove and a second circumferential main groove of the at least three circumferential main grooves, the second circumferential main groove being located in an inner side of the first circumferential main groove in the tire width direction and located closest to the first circumferential main groove, the first intermediate lug grooves extending from the second circumferential main groove toward the first circumferential main groove and being closed without reaching the first circumferential main groove, the first intermediate lug grooves being disposed at intervals in the tire circumferential direction,
- a plurality of inner lug grooves provided in a region of an inner land portion between the second circumferential main groove and a third circumferential main groove of the at least three circumferential main grooves, the third circumferential main groove being located opposite to the first circumferential main groove with respect to the second circumferential main groove, the inner lug grooves extending from the third circumferential main groove toward the second circumferential main groove and being closed without reaching the second circumferential main groove, the inner lug grooves being disposed at intervals in the tire circumferential direction, and
- a plurality of second intermediate lug grooves provided in a region of the intermediate land portion and extending from the first circumferential main groove toward the second circumferential main groove and being closed without reaching the second circumferential main groove, the second intermediate lug grooves being disposed at intervals in the tire circumferential direction.

A main groove side portion of each of the shoulder lug grooves includes a closed end of the shoulder lug groove and is located in a side of the first circumferential main groove. The main groove side portion extends at an incline with respect to the tire width direction.

In each of the first intermediate lug grooves and each of the inner lug grooves, a direction from one side toward the other side in the tire width direction is inclined, with respect to the tire width direction, to a side identical to a side to which a direction from one side toward the other side in the tire width direction of the main groove side portion is inclined.

The first intermediate lug grooves overlap with a plurality of extension lines each formed of each of the shoulder lug grooves smoothly extending from the closed end of each of the shoulder lug grooves along an inclination direction of the main groove side portion toward each of closed ends of the inner lug grooves.

The second intermediate lug grooves extend between two of the extension lines adjacent in the tire circumferential direction, in a direction along the extension lines.

Preferably, each of all the shoulder lug grooves and all the inner lug grooves forms an end in an extension direction of any one of the extension lines,
- each of all the first intermediate lug grooves overlaps with any one of the extension lines, and
- each of all the second intermediate lug grooves extends between any pair of the two extension lines adjacent in the tire circumferential direction.

Preferably, a range of each of the first intermediate lug grooves along the tire circumferential direction, a range of each of the inner lug grooves along the tire circumferential direction, and a range of each of the second intermediate lug grooves along the tire circumferential direction do not overlap with one another.

Preferably, the range of each of the first intermediate lug grooves along the tire circumferential direction do not overlap with a range of each of the shoulder lug grooves along the tire circumferential direction.

Preferably, assuming that L1 is a length along the tire circumferential direction between two connection positions at which two of the first intermediate lug grooves adjacent in the tire circumferential direction are connected to the second circumferential main groove, a position in the tire circumferential direction of an end in a side of the first circumferential main groove of each of the second intermediate lug grooves is within a range of from 50 to 90% of the length L1 from one of the connection positions.

Preferably, assuming that L2 is a length along the tire circumferential direction between closed ends of two of the shoulder lug grooves adjacent in the tire circumferential direction, a position in the tire circumferential direction of an end in a side of the first circumferential main groove of the second intermediate lug grooves is within a range of 30% of the length L2 with an intermediate point in the tire circumferential direction between the closed ends as a center.

Preferably, no lug groove overlapping with the extension lines and connected to the first circumferential main groove is provided in the region of the intermediate land portion.

Preferably, no lug groove overlapping with the extension lines and connected to the second circumferential main groove is provided in the region of the inner land portion.

Preferably, no circumferential narrow groove having a smaller groove width than a groove width of the circumferential main groove and extending in the tire circumferential direction is provided in the region of the intermediate land portion and the region of the inner land portion.

Preferably, ranges in the tire circumferential direction of the two extension lines adjacent in the tire circumferential direction do not overlap.

Preferably, a first side, with respect to a tire equator line, in the tire width direction in which the first circumferential main groove is located corresponds to a vehicle mounting outer side in a case where the pneumatic tire is mounted on a vehicle.

Preferably, the tread pattern further includes a fourth circumferential main groove provided in a second side, with respect to the tire equator line, opposite to the first side in the tire width direction in which the first circumferential main groove is located, and the fourth circumferential main groove is located in an outer side of the third circumferential main groove in the tire width direction, and extends in the tire circumferential direction.

Preferably, assuming that the intermediate land portion is referred to as a first intermediate land portion, a second intermediate land portion is located between the third circumferential main groove and the fourth circumferential main groove, and in a region of the second intermediate land portion, a circumferential narrow groove having a smaller groove width than a groove width of each of the circumferential main grooves and extending in the tire circumferential direction is provided.

Preferably, the tread pattern further includes
a plurality of third intermediate lug grooves provided in the region of the second intermediate land portion and extending from the fourth circumferential main groove toward the circumferential narrow groove and being closed without reaching the circumferential narrow groove, the third intermediate lug grooves being disposed at intervals in the tire circumferential direction, and
a plurality of sipes provided in the region of the second intermediate land portion, and connecting a closed end of each of the third intermediate lug grooves and the circumferential narrow groove in the region of the second intermediate land portion, the sipes being disposed at intervals in the tire circumferential direction.

Preferably, the third intermediate lug grooves and the sipes connected to one another include, as siped lug grooves,
a first siped lug groove extending while bending with an extension direction of each of the third intermediate lug grooves differing from an extension direction of each of the sipes, and
a second siped lug groove extending linearly with the extension direction of each of the third intermediate lug grooves aligning with the extension direction of each of the sipes.

Preferably, a range of each of the third intermediate lug grooves along the tire circumferential direction does not overlap with a range of each of the inner lug grooves along the tire circumferential direction.

According to an embodiment of the present technology, a pneumatic tire that provides improved noise performance as compared to in the related art while suppressing a decrease of wet performance.

DETAILED DESCRIPTION

Overall Description of Tire

Figure 1:
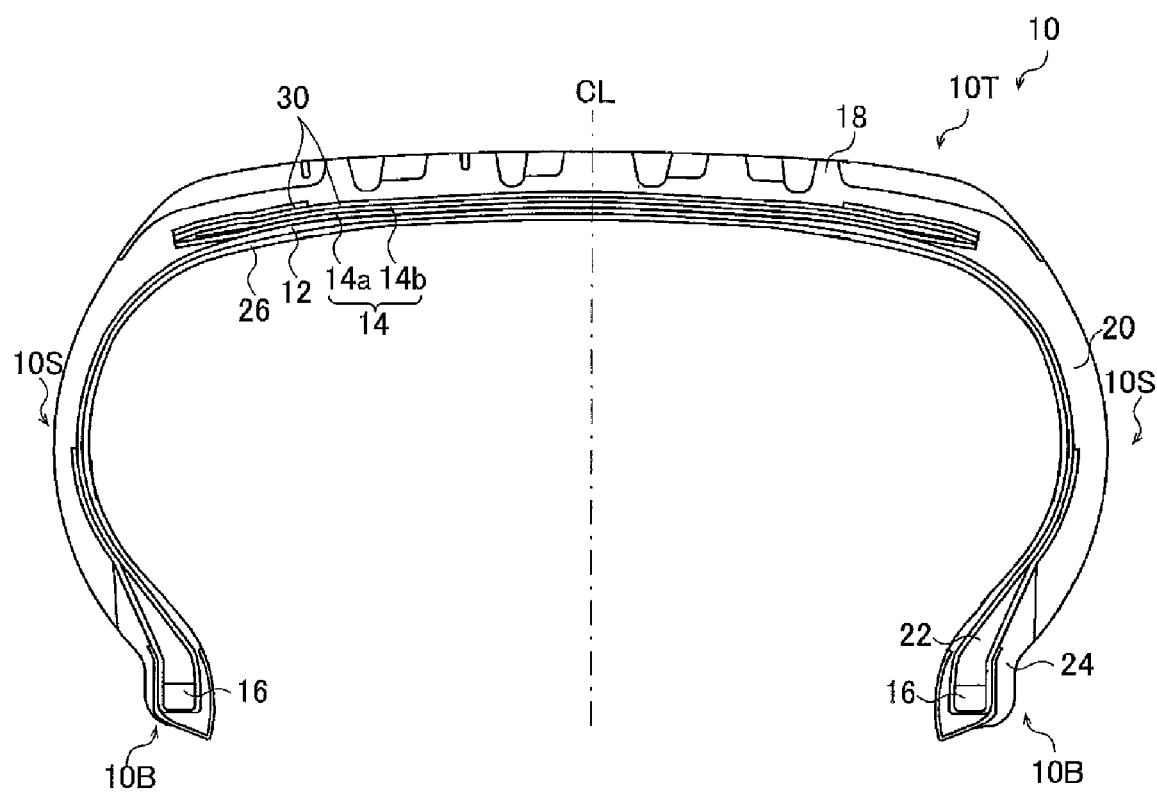
FIG. 1 is a diagram illustrating an example of a profile cross-section of a pneumatic tire according to the present embodiment.

A pneumatic tire according to the present embodiments (hereinafter, simply referred to as a "tire") will be described in detail below. The present embodiment includes various embodiments described below. FIG. 1 is a tire cross-sectional view illustrating an example of a profile cross-section of a tire 10.

The tire 10 is, for example, a tire for a passenger vehicle. Tire for a passenger vehicle refers to a tire specified in Chapter A of the JATMA Year Book 2012 (standards of The Japan Automobile Tyre Manufacturers Association, Inc.). Moreover, the tire 10 can also be applied to a tire for a small truck specified in Chapter B or a tire for a truck or a tire for a bus specified in Chapter C.

"Tire width direction" is the direction parallel with a rotation axis of a tire. "Outer side in tire width direction" is a side distant from a tire centerline CL (tire equator line) representing a tire equatorial plane in the tire width direction. Additionally, "inner side in tire width direction" is a side closer to the tire centerline CL in the tire width direction. "Tire circumferential direction" is the direction of rotation of a tire around the center of the rotation axis. "Tire radial direction" is the direction orthogonal to the rotation axis of a tire. "Outer side in tire radial direction" refers to a side distant from the rotation axis. Additionally, "inner side in tire radial direction" refers to a side closer to the rotation axis.

Tire Structure

The tire 10 includes a tread portion 10T including a tread pattern, a pair of bead portions 10B, and a pair of side portions 10S provided in both sides of the tread portion 10T and connected to the pair of bead portions 10B and the tread portion 10T.

The tire 10 includes a carcass ply 12, a belt 14, and a bead core 16 as framework members, and mainly include a tread rubber member 18, side rubber members 20, bead filler rubber members 22, rim cushion rubber members 24, and an innerliner rubber member 26 around the framework members.

The carcass ply 12 is formed of a carcass ply member that is made of organic fiber covered with rubber and that is wound between a pair of the bead cores 16 each having an annular shape and is formed into a toroidal shape. The carcass ply 12 is wound around the bead cores 16 and extends to an outer side in the tire radial direction. The belt 14 including two belt members 14a and 14b is provided in the outer side of the carcass ply 12 in the tire radial direction. The belt 14 includes a member including a steel cord covered with rubber, and arranged at an incline at a predetermined angle of, for example, from 20 to 30 degrees with respect to the tire circumferential direction. The belt member 14a that is a lower layer has a greater width in the tire width direction than the width of the belt member 14b that is an upper layer. Steel cords of the two belt members 14a and 14b are inclined in opposite directions. Thus, the belt members 14a and 14b are crossing layers and suppress expansion of the carcass ply 12 due to pressure of air in the tire.

The tread rubber member 18 is provided in an outer side of the belt 14 in the tire radial direction. The side rubber members 20 are connected to both end portions of the tread rubber member 18, and form the side portions 10S. Each of the rim cushion rubber members 24 is provided at an end in an inner side of each of the side rubber members 20 in the tire radial direction and comes into contact with a rim on which the tire 10 is mountable. Each of the bead filler rubber members 22 is provided in the outer side of each of the bead cores 16 in the tire radial direction and is interposed between a portion of the carcass ply 12 prior to being wound around the bead core 16 and a wound portion of the carcass ply 12 wound around the bead core 16. The innerliner rubber member 26 is provided in an inner surface of the tire 10 facing a tire cavity region that is filled with air and is surrounded by the tire 10 and the rim.

Moreover, two belt covers 30 formed of organic fiber covered with rubber are provided between the belt member 14b and the tread rubber member 18, and covers the belt 14 from the outer side of the belt 14 in the tire radial direction.

Tread Pattern

Figure 2:
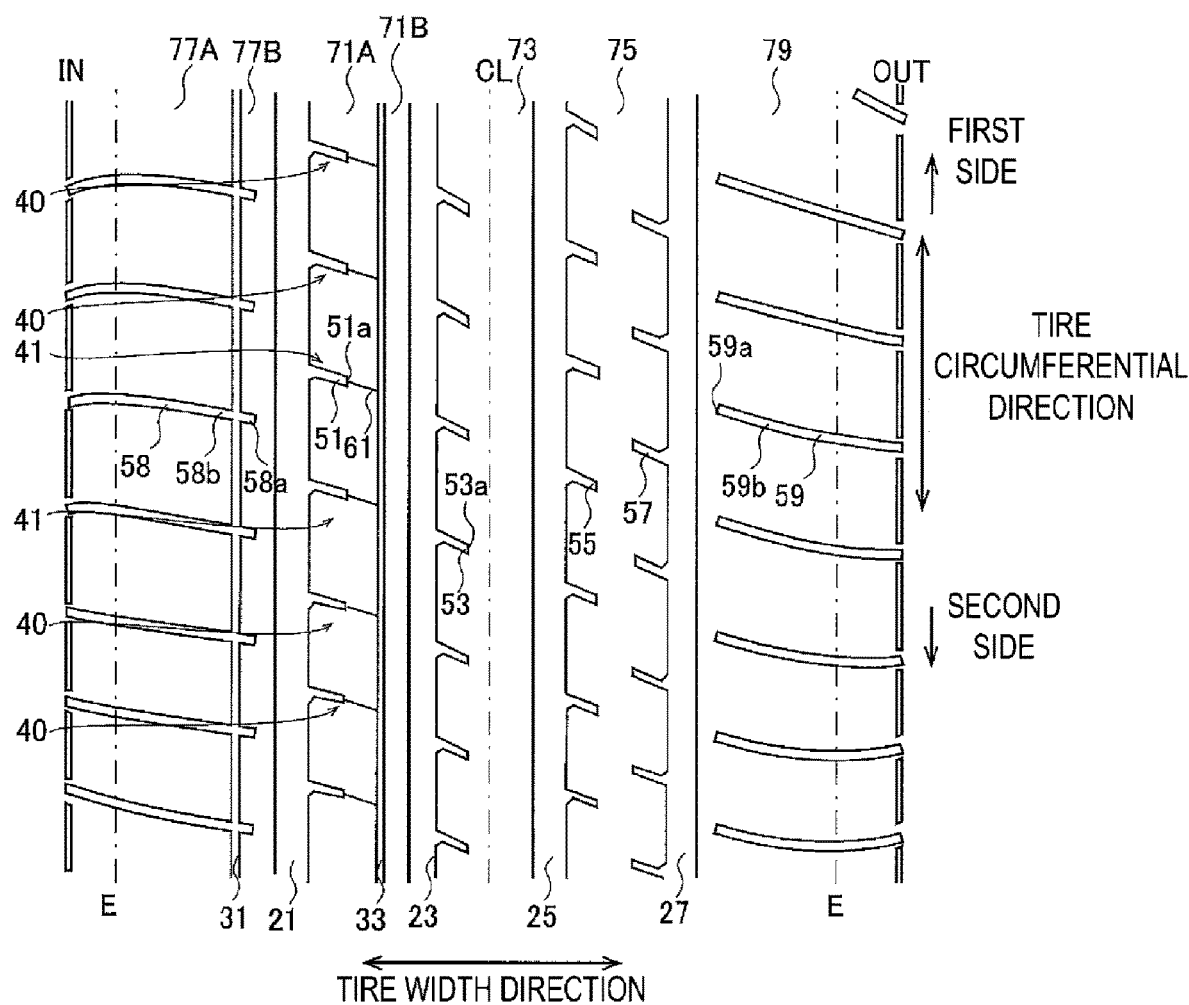
FIG. 2 is a diagram illustrating an example of a tread pattern of the tire of FIG. 1.

FIG. 2 is a diagram illustrating an example of a part of a tread pattern of the tire 10 of FIG. 1 developed into a plane.

The tread pattern according to the example illustrated in FIG. 2 includes main grooves (circumferential main grooves) 21, 23, 25, and 27 extending in the tire circumferential direction. Herein, main groove means a groove having a groove depth of, for example, from 6.5 to 9.0 mm and a groove width of, for example, from 5.0 to 15.0 mm.

In the present embodiment, the number of circumferential main grooves provided in the tread pattern may be three, or may be four, five, or the like.

The tread pattern according to the example illustrated in FIG. 2 further includes narrow grooves (circumferential narrow grooves) 31 and 33 extending in the tire circumferential direction. Each of the narrow grooves 31 and 33 has a smaller groove width and a smaller groove depth than the groove width and the groove depth of each of the main grooves 21, 23, 25, and 27. Herein, narrow groove means a groove having a groove depth of, for example, from 1.0 to 5.0 mm and a groove width of, for example, from 0.8 to 3.0 mm.

The narrow groove 31 is provided in a region located in an outer side of the main groove 21 in the tire width direction. The narrow groove 33 is provided in a region between the main grooves 21 and 23.

The tread pattern according to the example illustrated in FIG. 2 further includes lug grooves 51, 53, 55, 57, 58, and 59.

The lug groove 51 (third intermediate lug groove) extends from the main groove 21 (fourth circumferential main groove) in the tire width direction within a region 71A between the main groove 21 and the narrow groove 33 in a region of a second intermediate land portion between the main grooves 21 and 23 and is closed within the region 71A without reaching the main groove 21.

The lug groove 53 (inner lug groove) extends from the main groove 23 (third circumferential main groove) in the tire width direction within a region 73 of an inner land portion between the main grooves 23 and 25 and is closed within the region 73 without reaching the main groove 25. In the tread pattern according to the example illustrated in FIG. 2, the tire centerline CL is located within the region 73.

The lug groove 55 (first intermediate lug groove) extends from the main groove 25 (second circumferential main groove) in the tire width direction within a region 75 of a first intermediate land portion between the main grooves 25 and 27 and is closed within the region 75 without reaching the main groove 27.

The lug groove 57 (second intermediate lug groove) extends from the main groove 27 (first circumferential main groove) in the tire width direction within the region 75 and is closed within the region 75 without reaching the main groove 25.

In the example illustrated in FIG. 2, at connection positions where the lug grooves 51, 53, 55, and 57 are connected to the main grooves 21, 23, 25, and 27 respectively, a portion of the land portion is beveled (chamfered). The portion has a smaller angle of angles formed between extension directions of the lug grooves 51, 53, 55, and 57 and extension directions of the main grooves 21, 23, 25, and 27.

The lug groove 58 (hereinafter referred to as a shoulder lug groove 58) extends from the outer side in the tire width direction toward the main groove 21 within a region 77A of a shoulder land portion located in an outer side of the narrow groove 31 in the tire width direction, and intersects with the narrow groove 31. The lug groove 58 is closed within a region 77B between the narrow groove 31 and the main groove 21 without reaching the main groove 21.

The lug groove 59 (hereinafter referred to as a shoulder lug groove 59) extends from the outer side in the tire width direction toward the main groove 27 in the tire width direction within a region 79 of a shoulder land portion located in an outer side of the main groove 27 in the tire width direction and is closed within the region 79 without reaching the main groove 27.

Note that ground contact edges in the tire width direction are located within the regions 77B and 79. "Ground contact edges" refer to both ends in the tire width direction of a ground contact surface in a case where the tire 10 mounted on a regular rim, inflated to regular internal pressure, and loaded with 88% of a regular load is brought into contact with a horizontal surface. "Regular rim" refers to a "measurement rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). "Regular internal pressure" refers to "maximum air pressure" defined by JATMA, a maximum value in "TIRE LOAD LIMITS AT VARIOUS COLD INFLATION PRESSURES" defined by TRA, or "INFLATION PRESSURES" defined by ETRTO. "Regular load" refers to a "maximum load capacity" defined by JATMA, a maximum value in "TIRE LOAD LIMITS AT VARIOUS COLD INFLATION PRESSURES" defined by TRA, or "LOAD CAPACITY" defined by ETRTO.

A plurality of the lug grooves 51, 53, 55, 57, 58, and 59 are provided at intervals in the tire circumferential direction.

Each of the lug grooves has a smaller groove depth than the groove depth of each of the main grooves 21, 23, 25, and 27 and a larger groove depth than the groove depth of each of the narrow grooves 31 and 33. Each of the lug grooves herein has a groove depth of, for example, from 2.0 to 7.5 mm and a groove width of, for example, from 1.5 to 7.5 mm.

In the tread pattern according to the example illustrated in FIG. 2, the circumferential main grooves 21, 23, 25, and 27 and the lug grooves 51, 53, 55, 57, and 59 are provided, and thus drainage properties can be ensured, and a decrease of steering stability on wet road surfaces (hereinafter referred to as wet performance) can be suppressed.

On the other hand, in the tread pattern according to the example illustrated in FIG. 2, from the perspective of reducing tire noise, one of both ends in the extension direction of each of the lug grooves 51, 53, 55, and 57 is not connected to the main groove. Additionally, due to large groove volume of each of the shoulder lug grooves 58 and 59, from the perspective of reducing tire noise, the shoulder lug grooves 58 and 59 are not connected to the main grooves 27 and 21. In particular, in a case where the tire 10 is mounted on a vehicle, a groove located in a vehicle mounting outer side (side indicated by "OUT" in FIG. 2) with the tire centerline CL as a reference is more likely to affect noise performance than a groove located in a vehicle mounting inner side (side indicated by "IN" in FIG. 2). Thus, the shoulder lug groove 59 is not connected to the main groove 27.

The shoulder lug grooves 58 and 59 include closed ends 58a and 59a of the shoulder lug grooves 58 and 59, and main groove side portions 58b and 59b located in the circumferential main groove 21 and 27 side of ground contact edges E extend at an incline with respect to the tire width direction.

The direction from one side toward the other side in the tire width direction of each of the lug grooves 51, 53, 55, and 57 is inclined with respect to the tire width direction to a side identical to a side (a "first side" or a "second side" illustrated in FIG. 2) to which the direction from one side toward the other side in the tire width direction of each of the main groove side portions 58b and 59b of the shoulder lug grooves 58 and 59 is inclined.

The tread pattern according to the example illustrated in FIG. 2 further includes a sipe 61. The sipe 61 connects a closed end 51a of the lug groove 51 and the narrow groove 33, and extends in the tire width direction within the region 71A. The sipe 61 forms siped lug grooves 40 and 41 described below, together with the lug groove 51. A plurality of the sipes 61 are provided at intervals in the tire circumferential direction.

Each of the siped lug grooves 40 and 41 includes the sipe 61, and thus groove volume is reduced as compared to the case where the main groove 21 is connected to the narrow groove 33 by a lug groove, and generation of popping sound is suppressed. Thus, noise performance improves. Herein, "sipe" refers to a sipe having a sipe depth of, for example, from 2.0 to 7.5 mm and a sipe width of, for example, from 0.3 to 1.0 mm.

Figure 3:
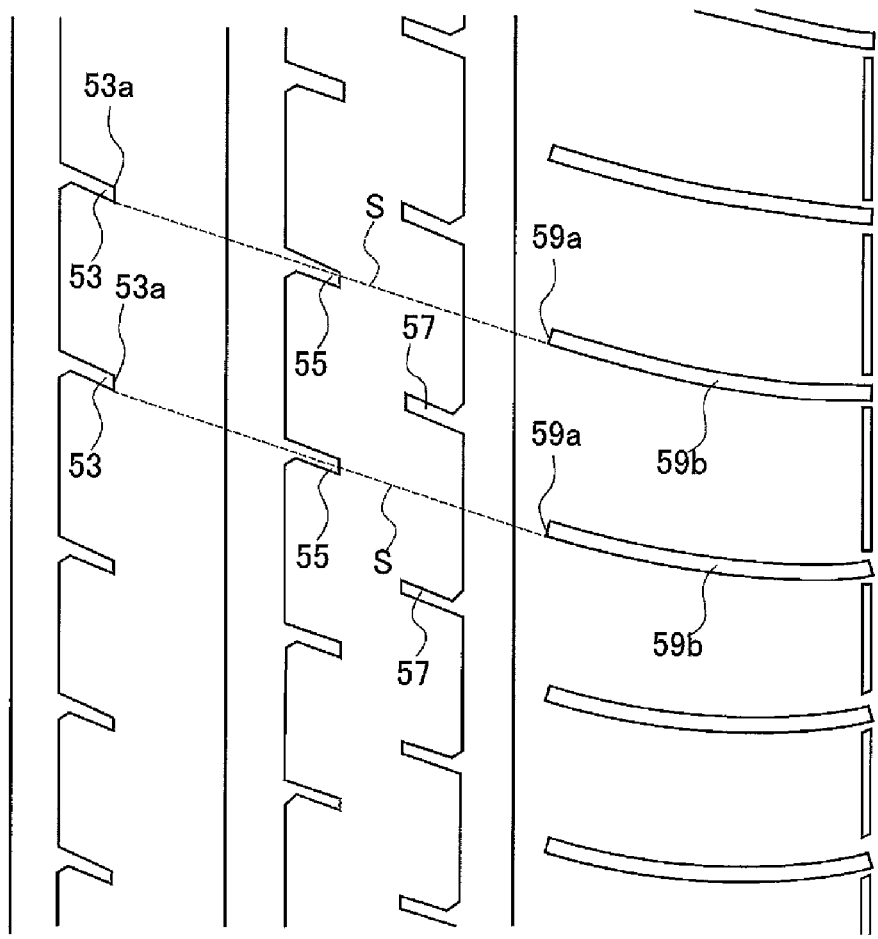
FIG. 3 is a diagram explaining an extension line.

In the present embodiment, as in an example illustrated in FIG. 3, the lug groove 55 (hereinafter referred to as the first intermediate lug groove 55) overlaps with each of a plurality of extension lines S. Then, the lug groove 57 (hereinafter referred to as the second intermediate lug groove 57) extends between two of the plurality of extension lines S adjacent in the tire circumferential direction, in a direction along the extension lines S. FIG. 3 is a diagram explaining the extension lines S, and illustrates the two extension lines S as representatives.

Each of the extension lines S is an imaginary line formed of each of a plurality of the shoulder lug grooves 59 smoothly extending along an inclination direction of the main groove side portion 59b from a closed end 59a of each of the plurality of shoulder lug grooves 59, toward each of closed ends 53a of a plurality of the lug grooves 53 (hereinafter referred to as the inner lug groove 53). The extension line S is a straight line. "Smoothly extending" means that at each of the closed ends 59a and 53a of the shoulder lug groove 59 and the inner lug groove 53, a smaller angle of angles formed between the inclination direction of the shoulder lug groove 59 and the inner lug groove 53 with respect to the tire width direction and the extension direction of the extension line S is equal to or less than 10 degrees, and preferably equal to or less than 5 degrees. A smaller angle of angles formed at the closed end of the inner lug groove 53 between the inclination direction of the inner lug groove 53 and the inclination direction of the extension line S is preferably equal to or less than 10 degrees, and more preferably equal to or less than 5 degrees.

That "first intermediate lug groove 55 overlaps with the extension line S" includes not only a configuration in which the first intermediate lug groove 55 is in contact with or intersects the extension line S but also a configuration in which the first intermediate lug groove 55 is in contact with or intersects a region located at a distance two-times the groove width of the first intermediate lug groove 55 from the extension line S in the direction orthogonal to the extension line S. Additionally, that "second intermediate lug groove 57 extends in direction along extension line S" means that an inclination angle with respect to the extension line S in the extension direction of the second intermediate lug groove 57 is within 10 degrees.

In this way, the shoulder lug groove 59, the first intermediate lug groove 55, and the inner lug groove 53 are located overlapping with the extension line S inclined with respect to the tire width direction. Thus, the shoulder lug groove 59, the first intermediate lug groove 55, and the inner lug groove 53 are likely to be dispersively disposed in the tire circumferential direction, and during kickoff from a road surface, popping sound is generated from the lug grooves 59, 55, and 53 at different timing. Thus, as compared to the case where popping sound is simultaneously generated from many lug grooves during kickoff, tire noise is reduced. In other words, noise performance improves.

On the other hand, the second intermediate lug groove 57 is disposed closer to the shoulder lug groove 59 than the inner lug groove 53 and the first intermediate lug groove 55. Thus, the second intermediate lug groove 57 is disposed extending between the two extension lines S adjacent in the tire circumferential direction along the extension lines S, and thus does not overlap with the extension lines S. This is because the shoulder lug groove 59 has large groove volume and generates loud popping sound and thus the second intermediate lug groove 57 is desirably separated from the shoulder lug groove 59 in the tire circumferential direction.

According to an embodiment, preferably, each of all the shoulder lug grooves 59 and all the inner lug grooves 53 forms an end in the extension direction of any extension line S of the plurality of extension lines S, and each of all the first intermediate lug grooves 55 overlaps with any of the extension lines S, and each of all the second intermediate lug grooves 57 extends between any pair of the two extension lines S adjacent in the tire circumferential direction. Accordingly, an effect of dispersively disposing the inner lug groove 53, the first intermediate lug groove 55, the second intermediate lug groove 57, and the shoulder lug groove 59 at mutually different positions in the tire circumferential direction is obtained in an entire circumference in the tire circumferential direction, and an effect of improving noise performance increases. Here, such a configuration is difficult to obtain in a case where, for example, in some of the region 73 of the inner land portion, the region 75 of the first intermediate land portion, and the region 79 of the shoulder land portion, a pitch length differs from the pitch length in the other regions, and an interval between the lug grooves adjacent in the tire circumferential direction differs from an interval between the lug grooves adjacent in the tire circumferential direction in the other regions.

According to an embodiment, preferably, in the region 75 of the first intermediate land portion, no lug groove overlapping with the extension line S and connected to the first circumferential main groove 27 is provided. Additionally, according to an embodiment, preferably, in the region 73 of the inner land portion, no lug groove overlapping with the extension line S and connected to the second circumferential main groove 25 is provided. When such a lug groove is provided, it is difficult to obtain an effect of dispersively disposing the lug grooves in the tire circumferential direction.

Preferably, in the region 75 of the first intermediate lug groove, no lug groove connected to the main groove 25 or the main groove 27 is provided, except for the first intermediate lug groove 55 and the second intermediate lug groove 57. Additionally, preferably, in the region 73 of the inner land portion, no lug groove connected to the main groove 23 or the main groove 25 is provided, except for the inner lug groove 53. Additionally, preferably, in the region 79 of the shoulder land portion, no lug groove is provided, except for the shoulder lug groove 59.

Figure 4:
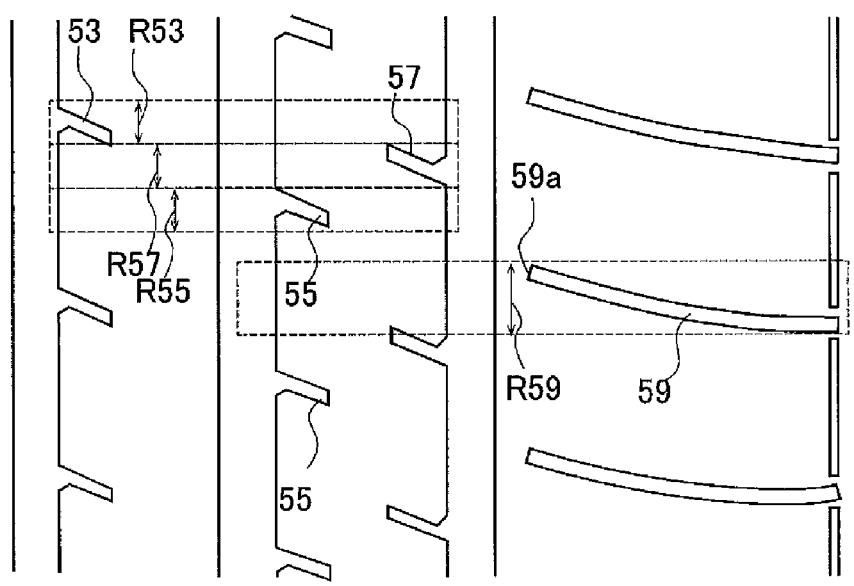
FIG. 4 is a diagram explaining an arrangement position of a lug groove along the tire circumferential direction.

According to an embodiment, as illustrated in FIG. 4, a range R55 of the first intermediate lug groove 55 along the tire circumferential direction, a range R53 of the inner lug groove 53 along the tire circumferential direction, and a range R57 of the second intermediate lug groove 57 along the tire circumferential direction preferably do not overlap with one another. FIG. 4 is a diagram explaining arrangement positions of the lug grooves 53, 55, and 57 along the tire circumferential direction. In this way, the first intermediate lug groove 55, the inner lug groove 53, and the second intermediate lug groove 57 are dispersively disposed at mutually different positions in the tire circumferential direction, and thus tire noise is effectively reduced.

Additionally, according to an embodiment, as illustrated in FIG. 4, the range R55 of the first intermediate lug groove 55 along the tire circumferential direction preferably does not overlap with a range R59 of the shoulder lug groove 59 along the tire circumferential direction. In this way, the first intermediate lug groove 55 and the shoulder lug groove 59 are disposed at mutually different positions in the tire circumferential direction, and thus tire noise is effectively reduced.

Figure 5:
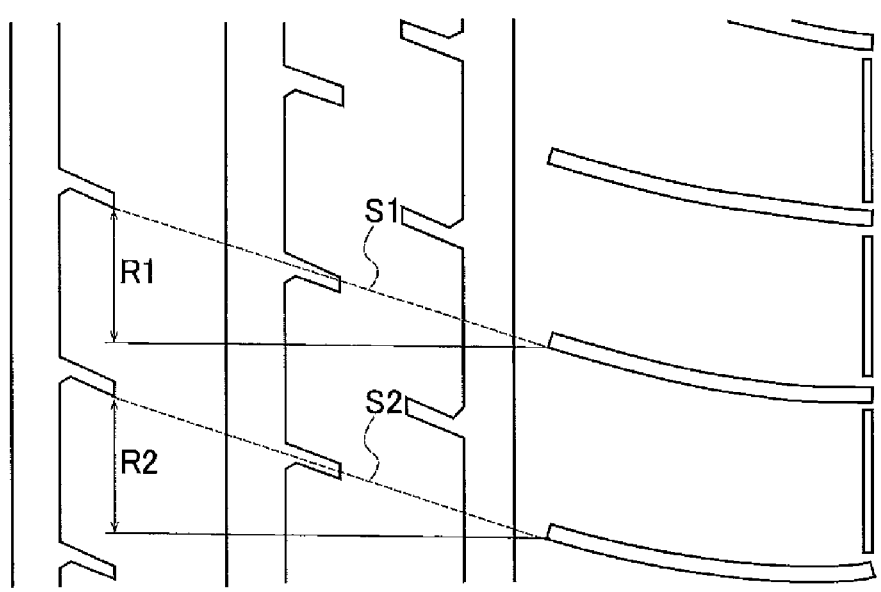
FIG. 5 is a diagram explaining an arrangement position of an extension line along the tire circumferential direction.

According to an embodiment, as illustrated in FIG. 5, ranges R1 and R2 in the tire circumferential direction of extension lines S1 and S2 adjacent in the tire circumferential direction preferably do not overlap with each other. FIG. 5 is a diagram explaining an arrangement position of the extension line S along the tire circumferential direction. When the ranges R1 and R2 of the two extension lines S1 and S2 along the tire circumferential direction overlap with each other, an effect of dispersively disposing the inner lug groove 53, the first intermediate lug groove 55, the second intermediate lug groove 57, and the shoulder lug groove 59 in the tire circumferential direction is difficult to obtain. Thus, a magnitude of an inclination angle of the extension line S with respect to the tire width direction is preferably from 10 to 30 degrees.

Figure 6:
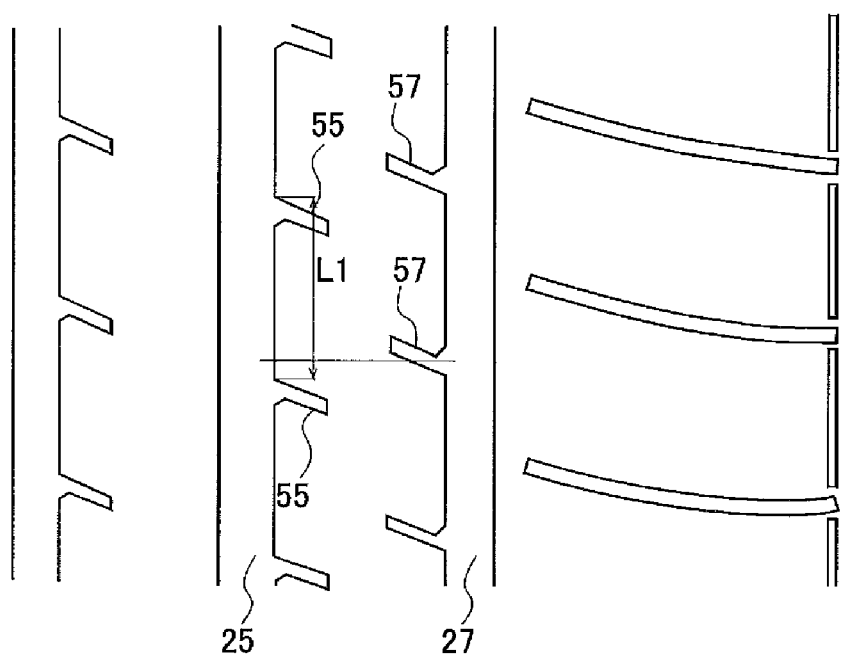
FIG. 6 is a diagram explaining an arrangement position of a lug groove along the tire circumferential direction.

According to an embodiment, as illustrated in FIG. 6, assuming that L1 is a length along the tire circumferential direction between two connection positions at which two of the first intermediate lug grooves 55 adjacent in the tire circumferential direction are connected to the second circumferential main groove 25, a position in the tire circumferential direction of an end in a side of the first circumferential main groove 27 of the second intermediate lug groove 57 is preferably within the range of from 50 to 90% and more preferably from 70 to 90% of the length L1 from one (first side in FIG. 6) of the two connection positions. FIG. 6 is a diagram explaining positional relationship between the first intermediate lug groove 55 and the second intermediate lug groove 57 along the tire circumferential direction. In this way, an effect of reducing tire noise increases. Note that one of connecting positions refers to a connection position of the first circumferential main groove 25 and the first intermediate lug groove 55 including the closed end within the range in the tire circumferential direction between the two connection positions.

Figure 7:
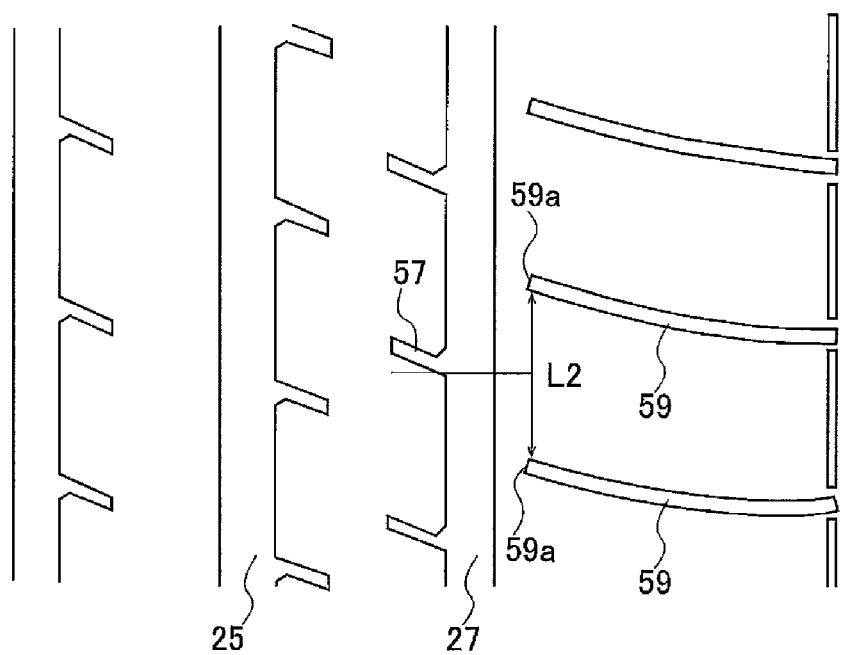
FIG. 7 is a diagram explaining an arrangement position of a lug groove along the tire circumferential direction.

According to an embodiment, as illustrated in FIG. 7, assuming that L2 is a length along the tire circumferential direction between the closed ends 59a of two of the shoulder lug grooves 59 adjacent in the tire circumferential direction, a position in the tire circumferential direction of an end in a side of the first circumferential main groove 27 of the second intermediate lug groove 57 is preferably within the range of 30% and more preferably 20% of the length L2 in the tire circumferential direction with an intermediate point in the tire circumferential direction between the closed ends 59a as the center. FIG. 7 is a diagram explaining positional relationship between the shoulder lug groove 59 and the second intermediate lug groove 57 along the tire circumferential direction. Accordingly, an effect of reducing tire noise increases. Note that "intermediate point" means a midpoint of a line segment connecting the closed ends 59a adjacent to each other.

In the two embodiments described above, the connection position of the second intermediate lug groove 57 and the first circumferential main groove 27 does not include the above-described beveled (chamfered) portion.

According to an embodiment, preferably, in the region 75 of the first intermediate land portion and the region 73 of the inner land portion, no circumferential narrow groove extending in the tire circumferential direction and having a smaller groove width than the groove width of each of the circumferential main grooves 21, 23, 25, and 27 is provided. Accordingly, tire noise can be reduced effectively.

Preferably, no circumferential narrow groove is provided in the region 79 of the shoulder land portion.

According to an embodiment, the first side, with respect to the tire centerline CL, in the tire width direction in which the first circumferential main groove 27 is located preferably corresponds to a vehicle mounting outer side in a case where the tire 10 is mounted on a vehicle. The first circumferential main groove 27 is located in the vehicle mounting outer side that significantly affects noise performance, and thus the above-described effect of reducing tire noise increases.

According to an embodiment, the tread pattern preferably further includes the fourth circumferential main groove 21 and the circumferential narrow groove 33 as in the example illustrated in FIG. 2.

The fourth circumferential main groove 21 is provided in a second side with respect to the tire centerline CL opposite to the first side in the tire width direction in which the first circumferential main groove 27 is located, and is located in an outer side of the third circumferential main groove 23 in the tire width direction.

The circumferential narrow groove 33 is provided in the region of the second intermediate land portion. The narrow groove 33 is provided in the vehicle mounting inner side that less significantly affects noise performance, and thus wet performance effectively improves without decreasing noise performance.

Preferably, the circumferential narrow groove 31 is preferably provided in the region of the shoulder land portion located in an outer side of the main groove 21 in the tire width direction. Accordingly, an effect of improving wet performance increases without decreasing noise performance.

The number of the circumferential narrow grooves provided in the second side may be one, or may be three, four, or the like.

According to an embodiment, the length of each of the third intermediate lug groove 51, the inner lug groove 53, the first intermediate lug groove 55, and the second intermediate lug groove 57 along the tire width direction is preferably 20 to 50%, and more preferably 30 to 40% of the length in the tire width direction (width) of each of the regions of the second intermediate land portion, the inner land portion, and the first intermediate land portion in which the lug grooves 51, 53, 55, and 57 are respectively located. Additionally, preferably, some (for example, the third intermediate lug groove 51) of the third intermediate lug groove 51, the inner lug groove 53, the first intermediate lug groove 55, and the second intermediate lug groove 57 have larger lengths than the lengths of the other lug grooves (for example, 115 to 125% of the length of each of the other lug grooves), and the other lug grooves have an mutually equal length.

Note that the length of the third intermediate lug groove 51 along the tire width direction is preferably 30 to 80% of the length in the tire width direction (width) of the region 71A.

Additionally, according to an embodiment, the inner lug groove 53, the first intermediate lug groove 55, and the second intermediate lug groove 57 preferably have a substantially equal inclination angle with respect to the tire width direction. "Substantially equal" refers to a difference in the inclination angle between the lug grooves being up to 10 degrees, and preferably up to 5 degrees.

According to an embodiment, the tread pattern preferably further includes the siped lug groove described above, as in the example illustrated in FIG. 2. A plurality of the siped lug grooves preferably include the first siped lug groove 40 and the second siped lug groove 41 described below.

The first siped lug groove 40 extends and bends with the extension direction of the lug groove 51 differing from the extension direction of the sipe 61, and at least one first siped lug groove 40 is provided in the region 71A. The first siped lug groove 40 including such a configuration is provided, and thus edge components extending in various directions are formed in the tread surface. Thus, steering stability on wet low-μ road surfaces (water depth of 1 to 3 mm) is likely to improve. Note that, in a case where the first siped lug groove 40 extends in a curved manner, "extension direction of lug groove 51 differing from extension direction of sipe 61" means that the extension direction of the lug groove 51 and the extension direction of the sipe 6 differ from each other at the closed end 51a of the lug groove 51.

The second siped lug groove 41 extends linearly with the extension direction of the lug groove 51 aligning with the extension direction of the sipe 61, and at least one second siped lug groove 41 is provided in the region 71A. The second siped lug groove 41 including such a configuration is provided, and thus during turning, a block in the region 71A is likely to flex and deform in conformity with a road surface. Thus, adhesive friction between the tread surface and a road surface increases, and steering stability on wet road surfaces particularly during turning is likely to improve. Note that in the region 71A, a plurality of blocks defined by the main groove 21, the narrow groove 33, and the two siped lug grooves adjacent in the tire circumferential direction are arranged in the tire circumferential direction.

In this embodiment, based on the finding that a mixture of the first siped lug groove 40 and the second siped lug groove 41 is provided in the region 71A, and thus steering stability on wet road surfaces (hereinafter referred to as wet performance) improves in various aspects in a well-balanced manner, the first siped lug groove 40 and the second siped lug groove 41 are provided in the tread pattern.

A bend angle of the lug groove 51 and the sipe 61 (a smaller angle of angles formed between the extension direction of the lug groove 51 and the extension direction of the sipe 61) that distinguishes the first siped lug groove 40 from the second siped lug groove 41 ranges from 1 to 5 degrees, for example. In a case where a bend angle of the siped lug groove is equal to or greater than the above-described bend angle that distinguishes the first siped lug groove 40 from the second siped lug groove 41, the siped lug groove corresponds to the first siped lug groove 40, and in a case where a bend angle of the siped lug groove is less than the above-described bend angle that distinguishes the first siped lug groove 40 from the second siped lug groove 41, the siped lug groove corresponds to the second siped lug groove 41.

According to an embodiment, the first siped lug groove 40 preferably includes a plurality of types of siped lug grooves having different bend angles. Accordingly, edge components extending in various directions are made, and contribute to improvement of wet performance.

According to an embodiment, the first siped lug groove 40 and the second siped lug groove 41 are preferably disposed forming a pair adjacent in the tire circumferential direction. Accordingly, an effect of edge components formed by the first siped lug groove 40 and an effect of ease of flexing of a block obtained by the second siped lug groove 41 are each enhanced, and an effect of improving wet performance in a well-balanced manner increases.

According to an embodiment, a ratio of the number of the first siped lug grooves 40 to the number of the second siped lug grooves 41 in the region 71A is preferably 1 to 5. When the ratio exceeds 5, the number of the second siped lug grooves 41 is excessively small, and an effect of improving wet performance by ease of flexing of a block may not be obtained sufficiently. When the ratio is less than 1, the number of the first siped lug grooves 40 is excessively small, and an effect of improving wet performance by edge components may not be obtained sufficiently. The ratio is preferably 1.2 to 3.

Figure 8:
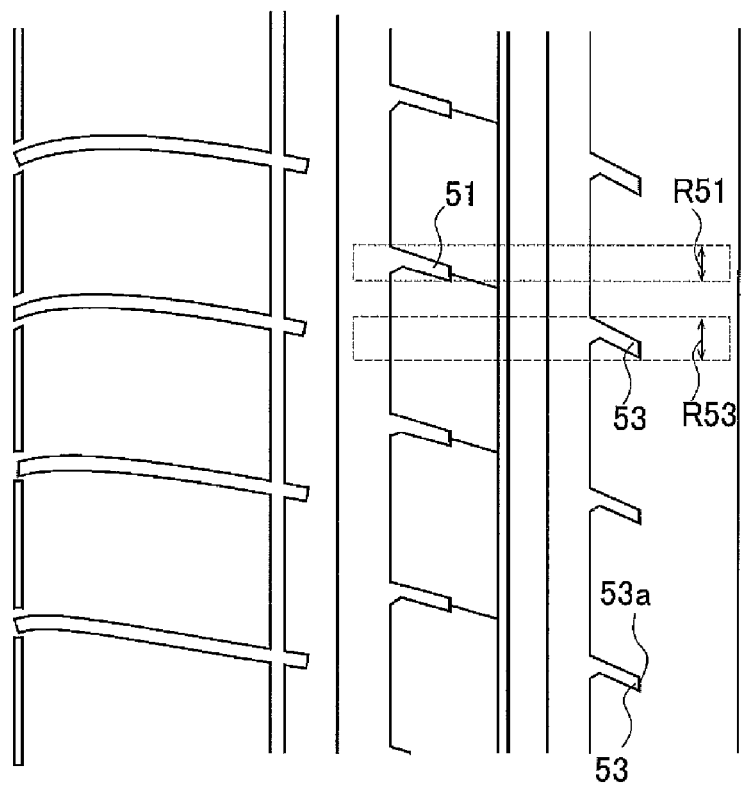
FIG. 8 is a diagram explaining an arrangement position of a lug groove along the tire circumferential direction.

According to an embodiment, as illustrated in FIG. 8, a range R51 of the third intermediate lug groove 51 along the tire circumferential direction preferably does not overlap with a range R53 of the inner lug groove 53 along the tire circumferential direction. FIG. 8 is a diagram explaining positional relationship between the third intermediate lug groove 51 and the inner lug groove 53 along the tire circumferential direction. In this way, the third intermediate lug groove 51 and the inner lug groove 53 are disposed at mutually different positions in the tire circumferential direction, and thus tire noise is effectively reduced.

Further, the range R51 of the third intermediate lug groove 51 along the tire circumferential direction preferably does not overlap with the range of the shoulder lug groove 58 along the tire circumferential direction.

According to an embodiment, the third intermediate lug groove 51 preferably overlaps with an imaginary straight line (second extension line) extending from a connection position of the inner lug groove 53 and the third circumferential main groove 23 to the outer side in the tire width direction (vehicle mounting inner side in FIG. 2) along the inclination direction of the inner lug grooves 53 with respect to the tire width direction. That "third intermediate lug groove 51 overlaps with second extension line" includes not only a configuration in which the third intermediate lug groove 51 is in contact with or intersects the second extension line but also a configuration in which the third intermediate lug groove 51 is in contact with or intersects a region located at a distance two-times the groove width of the third intermediate lug groove 51 from the second extension line in the direction orthogonal to the second extension line.

In the tread pattern according to the example illustrated in FIG. 2, no lug groove and no sipe connected to the narrow groove 33 or the main groove 23 is provided in a region 71B, and a rib extending continuously in the tire circumferential direction is formed. Additionally, no lug groove and no sipe connected to the narrow groove 31 or the main groove 21 is provided in the region 77B, and a rib extending continuously in the tire circumferential direction is formed. In this way, in the region of the tread pattern disposed in a vehicle inner side, many edge components extending in the tire circumferential direction are made by the two narrow grooves 31 and 33. Additionally, the rigidity of the two ribs is ensured, and thus steering stability by an inner ring during turning increases. Preferably, the length in the tire width direction (width) of the region 77B is larger than the width of the region 71B.

The tread pattern of the present embodiment is not limited to the tread pattern according to the example illustrated in FIG. 2.

COMPARATIVE EXAMPLES AND EXAMPLES

To examine effects of a pneumatic tire of the present embodiment, a tread pattern of the tire was varied, and wet performance and noise performance were examined. A prototype tire had a size of 225/65R17 and was based on the tread pattern illustrated in FIG. 2, except for the specifications indicated in Tables 1 and 2.

Table 1 and Table 2 indicate a configuration related to the tread pattern of each tire and evaluation results for the configuration.

In Tables 1 and 2, "overlapping of first intermediate lug groove and inner lug groove and second intermediate lug groove", "overlapping of first intermediate lug groove and shoulder lug groove", and "overlapping of third intermediate lug groove and inner lug groove" mean overlapping of the ranges of the lug grooves along the tire circumferential direction.

"Narrow groove in first side" means a narrow groove provided in a region of a land portion of at least one of the first intermediate lug groove and the inner lug groove.

In regard to "siped lug groove," "No" means that the sipe 61 is not provided and that only the lug groove 51 is provided.

"Relationship between connection position of second intermediate lug groove and main groove, and L1" means by what percent of L1 from a connection position in the first side of two connection positions at which two first intermediate lug grooves adjacent in the tire circumferential direction are connected to the second circumferential main groove, a connection position of the second intermediate lug groove and the first circumferential main groove is located.

"Relationship between connection position of second intermediate lug groove and main groove, and L2" means by what percent of L2 in the tire circumferential direction with a midpoint in the tire circumferential direction between closed ends of two shoulder lug grooves adjacent in the tire circumferential direction as the center, a connection position of the second intermediate lug groove and the first circumferential main groove is located.

In this section, "+" in Comparative Example 2 and Example 2 means that the connection position is located in the first side from the intermediate point, and "−" in Example 3 means that the connection position is located in the second side from the intermediate point.

In Comparative Example 1, in the tread pattern according to Example 1, a position in the tire circumferential direction of an inner lug groove was displaced in the region 73 and the range of the inner lug groove along the tire circumferential direction overlapped with the range of a first intermediate lug groove and thus a change was made such that the first intermediate lug groove did not overlap with an imaginary line connecting a closed end of a shoulder lug groove and the inner lug groove. Additionally, in Comparative Example 1, an inclination angle of a main groove side portion of the shoulder lug groove was adjusted and an extension line smoothly extended from the closed end of the shoulder lug groove.

In Comparative Example 2, in the tread pattern according to Example 1, a second intermediate lug groove was provided at a position where the second intermediate lug groove overlapped with an extension line.

In Example 1, a third intermediate lug groove was disposed without overlapping with a second extension line extending from a connection position of an inner lug groove and the main groove 23 to an outer side in the tire width direction (vehicle mounting inner side) along the inclination direction of the inner lug groove with respect to the tire width direction. Additionally, in Example 1, in the tread pattern illustrated in FIG. 2, the circumferential narrow groove in each of the second intermediate land portion and the shoulder land portion in the second side (vehicle mounting inner side) was omitted. Additionally, in the second intermediate land portion, the sipe connected to the third intermediate lug grooves was omitted.

In Example 2, in the tread pattern according to Example 1, an inclination angle of an extension line with respect to the tire width direction was set to 10 degrees, and a change was made such that the range of a first intermediate lug groove overlapped with the range of an inner lug groove along the tire circumferential direction.

Note that, in each of Comparative Example 2, Example 1, and Example 3 to 8, an inclination angle of an extension line with respect to the tire width direction was set to 25 degrees.

In Example 4, in the tread pattern according to Example 1, a circumferential narrow groove was provided in a region of a first intermediate land portion between a closed end of a first intermediate lug groove and a closed end of a second intermediate lug groove in the tire width direction.

In Example 5, a tire including the tread pattern according to Example 1 was mounted on a test vehicle with vehicle mounting orientation reversed with respect to vehicle mounting orientation in Example 1.

In Example 6, in the tread pattern according to Example 1, a total of two circumferential narrow grooves were disposed in each of a second intermediate land portion and a shoulder land portion in a second side (vehicle mounting inner side).

In Example 7, in the tread pattern according to Example 6, a sipe connecting a third intermediate lug groove to a circumferential narrow groove was further provided in a region of a second intermediate land portion. In other words, a siped lug groove was provided in the region of the second intermediate land portion. Each of a plurality of the siped lug grooves included the first siped lug groove and the second siped lug groove described above, and a ratio of the number of the first siped lug grooves to the number of the second siped lug grooves was set to 2. Bend angles of the second siped lug grooves were two types of 2 degrees and 3 degrees. Additionally, the first siped lug groove and the second siped lug groove having the same bend angle were disposed to form the pair described above.

In Example 8, in the tread pattern according to Example 7, a third intermediate lug groove was further disposed overlapping with a second extension line.

These test tires were evaluated for noise performance and wet performance as described below. The results of the evaluation were indicated in Tables 1 and 2. The evaluation was performed with the test tires each mounted on a wheel having a rim size of 17×7J, mounted on a front wheel drive vehicle with an engine displacement of 2400 cc, and inflated to air pressure of 230 kPa.

Noise Performance

Pass-by noise outside of a vehicle of each test tire was measured in accordance with European noise regulation conditions (ECE R117). The evaluation results were expressed as index values by using reciprocals of measurement values, with Comparative Example 1 being assigned as the reference 100. The larger index value means excellent noise performance.

Wet Performance

A vehicle traveled at a speed of 40 to 100 km/hour on a test course of an asphalt road surface where a road surface sprinkled with water to have a water depth of 1 to 2 mm was provided in a partial section, and other sections were sprinkled with water to have a water depth of less than 1 mm. A test driver performed sensory evaluation for steering characteristics when changing a lane and when cornering, and stability when traveling straight. Wet performance is expressed as index values with Comparative Example 1 used as a tire according to the related art and being assigned as the reference 100. The larger index value indicates excellent wet performance.

As a result, the case where a wet performance index was 99 or more and a noise performance index was 101 or more was determined to enable noise performance to improve as compared to in the related art while suppressing a decrease of wet performance.

TABLE 1

|  | Comparative Example 1 | Comparative Example 2 | Example 1 | Example 2 | Example 3 |
|---|---|---|---|---|---|
| Overlapping of first intermediate lug groove and extension line | No | Yes | Yes | Yes | Yes |
| Second intermediate lug groove extending between extension lines | Yes | No | Yes | Yes | Yes |
| Overlapping of first intermediate lug groove, inner lug groove and second intermediate lug groove | Yes | No | No | Yes | No |
| Overlapping of first intermediate lug groove and shoulder lug groove | No | No | No | No | No |
| Relationship between connection position of second intermediate lug groove and main groove, and L1 (%) | 90 | 25 | 90 | 65 | 45 |
| Relationship between connection position of second intermediate lug groove and main groove, and L2 (%) | 0 | +25 | 0 | +10 | −40 |
| Narrow groove in first side | No | No | No | No | No |
| Vehicle mounting side in first side | Outer side | Outer side | Outer side | Outer side | Outer side |
| Narrow groove in second intermediate land portion | No | No | No | No | No |
| Siped lug groove | No | No | No | No | No |

TABLE 1-continued

|  | Comparative Example 1 | Comparative Example 2 | Example 1 | Example 2 | Example 3 |
|---|---|---|---|---|---|
| Overlapping of third intermediate lug groove and inner lug groove | Yes | Yes | Yes | Yes | Yes |
| Noise performance | 100 | 104 | 105 | 103 | 102 |
| Wet performance | 100 | 97 | 100 | 99 | 100 |

TABLE 2

|  | Example 4 | Example 5 | Example 6 | Example 7 | Example 8 |
|---|---|---|---|---|---|
| Overlapping of first intermediate lug groove and extension line | Yes | Yes | Yes | Yes | Yes |
| Second intermediate lug groove extending between extension lines | Yes | Yes | Yes | Yes | Yes |
| Overlapping of first intermediate lug groove, inner lug groove and second intermediate lug groove | No | No | No | No | No |
| Overlapping of first intermediate lug groove and shoulder lug groove | No | No | No | No | No |
| Relationship between connection position of second intermediate lug groove and main groove, and L1 (%) | 90 | 90 | 90 | 90 | 90 |
| Relationship between connection position of second intermediate lug groove and main groove, and L2 (%) | 0 | 0 | 0 | 0 | 0 |
| Narrow groove in first side | Yes | No | No | No | No |
| Vehicle mounting side in first side | OUTER SIDE | INNER SIDE | OUTER SIDE | OUTER SIDE | OUTER SIDE |
| Narrow groove in second intermediate land portion | No | No | Yes | Yes | Yes |
| Siped lug groove | No | No | No | Yes | Yes |
| Overlapping of third intermediate lug groove and inner lug groove | Yes | Yes | Yes | Yes | No |
| Noise performance | 102 | 103 | 103 | 103 | 104 |
| Wet performance | 102 | 99 | 103 | 106 | 106 |

As can be seen from comparison between Comparative Examples 1 and 2 and Examples 1 to 8, the first intermediate lug groove overlaps with the extension line, and the second intermediate lug groove extends between the adjacent extension lines along the extension lines, and thus noise performance improves as compared to in the related art while suppressing a decrease of wet performance.

As can be seen from comparison between Example 1 and Example 2, the ranges of the first intermediate lug groove, the inner lug groove, and the second intermediate lug groove along the tire circumferential direction do not overlap, and thus noise performance improves.

As can be seen from comparison between Example 1 and Example 3, the relationship between the connection position of the second intermediate lug groove and the first circumferential main groove, and L1 or L2 satisfies the relationship described in the above-described embodiments, and thus noise performance improves.

As can be seen from comparison between Example 1 and Example 4, no tire circumferential narrow groove is provided in the inner land portion or the first intermediate land portion, and thus noise performance improves.

As can be seen from comparison between Example 1 and Example 5, the first side is disposed in the vehicle mounting outer side, and thus noise performance improves.

As can be seen from comparison between Example 1 and Example 6, the narrow groove is provided in the second intermediate land portion, and thus wet performance improves.

As can be seen from comparison between Example 6 and Example 7, the siped lug groove is provided, and thus wet performance improves.

As can be seen from comparison between Example 7 and Example 8, the third intermediate lug groove and the inner lug groove do not overlap along the tire circumferential direction, and thus noise performance improves.

The pneumatic tire according to an embodiment of the present technology is described above in detail. However, the pneumatic tire according to an embodiment of the present technology is not limited to the above-described embodiments or examples and, as a matter of course, may be enhanced or modified in various ways without departing from the scope of the present technology.

The invention claimed is:

1. A pneumatic tire comprising a tread pattern, the tread pattern comprising at least three circumferential main grooves extending in a tire circumferential direction at intervals from each other, a plurality of shoulder lug grooves located in an outer side in a tire width direction of a first circumferential main groove located outermost in the tire width direction of the at least three circumferential main grooves, the shoulder lug grooves being provided in a region of a shoulder land portion in which a ground contact edge in the tire width direction is located, the shoulder lug grooves extending from the outer side in the tire width direction toward the first circumferential main groove and being closed without reaching the first circumferential main groove, the shoulder lug grooves being disposed at intervals in the tire circumferential direction, a plurality of first intermediate lug grooves provided in a region of an intermediate land portion between the first circumferential main groove and a second circumferential main groove of the at least three circumferential main grooves, the second circumferential main groove being located in an inner side of the first circumferential main groove in the tire width direction and located closest to the first circumferential main groove, the first intermediate lug grooves extending from the second circumferential main groove toward the first circumferential main groove and being closed without reaching the first circumferential main groove, the first intermediate lug grooves being disposed at intervals in the tire circumferential direction; a plurality of inner lug grooves provided in a region of an inner land portion between the second circumferential main groove and a third circumferential main groove of the at least three circumferential main grooves, the third circumferential main groove being located opposite to the first circumferential main groove with respect to the second circumferential main groove, the inner lug grooves extending from the third circumferential main groove toward the second circumferential main groove and being closed without reaching the second circumferential main groove, the inner lug grooves being disposed at intervals in the tire circumferential direction, and a plurality of second intermediate lug grooves provided in a region of the intermediate land portion and extending from the first circumferential main groove toward the second circumferential main groove and being closed without reaching the second circumferential main groove, the second intermediate lug grooves being disposed at intervals in the tire circumferential direction, a main groove side portion of each of the shoulder lug grooves including a closed end of the shoulder lug groove and located in a side of the first circumferential main groove, the main groove side portion extending at an incline with respect to the tire width direction; in each of the first intermediate lug grooves and each of the inner lug grooves, a direction from one side toward the other side in the tire width direction being inclined, with respect to the tire width direction, to a side identical to a side to which a direction from one side toward the other side in the tire width direction of the main groove side portion is inclined, the first intermediate lug grooves overlapping with a plurality of extension lines each formed of each of the shoulder lug grooves smoothly extending from the closed end of each of the shoulder lug grooves along an inclination direction of the main groove side portion toward each of closed ends of the inner lug grooves and contacting each of the closed ends of the inner lug grooves, the extension lines being straight lines, a smaller angle of angles formed at a closed end of each of the shoulder lug grooves between the inclination direction of the main groove side portion and an inclination direction of each of the extension lines being equal to or less than 10 degrees, and a smaller angle of angles formed at a closed end of each of the closed ends of the inner lug grooves between an inclination direction of the inner lug grooves and the inclination direction of each of the extension lines being equal to or less than 10 degrees, and the second intermediate lug grooves extending between two of the extension lines adjacent in the tire circumferential direction, in a direction along the extension lines.

2. The pneumatic tire according to claim 1, wherein each of all the shoulder lug grooves and all the inner lug grooves forms an end in an extension direction of any one of the extension lines,
each of all the first intermediate lug grooves overlaps with any one of the extension lines, and
each of all the second intermediate lug grooves extends between any pair of the two extension lines adjacent in the tire circumferential direction.

3. The pneumatic tire according to claim 1, wherein a range of each of the first intermediate lug grooves along the tire circumferential direction, a range of each of the inner lug grooves along the tire circumferential direction, and a range of each of the second intermediate lug grooves along the tire circumferential direction do not overlap with one another.

4. The pneumatic tire according to claim 1, wherein a range of each of the first intermediate lug grooves along the tire circumferential direction does not overlap with a range of each of the shoulder lug grooves along the tire circumferential direction.

5. The pneumatic tire according to claim 1, wherein assuming that L1 is a length along the tire circumferential direction between two connection positions at which two of the first intermediate lug grooves adjacent in the tire circumferential direction are connected to the second circumferential main groove, a position in the tire circumferential direction of an end in a side of the first circumferential main groove of each of the second intermediate lug grooves is within a range of from 50 to 90% of the length L1 from one of the connection positions.

6. The pneumatic tire according to claim 1, wherein assuming that L2 is a length along the tire circumferential direction between closed ends of two of the shoulder lug grooves adjacent in the tire circumferential direction, a position in the tire circumferential direction of an end in a side of the first circumferential main groove of the second intermediate lug grooves is within a range of 30% of the length L2 with an intermediate point in the tire circumferential direction between the closed ends as a center.

7. The pneumatic tire according to claim 1, wherein no circumferential narrow groove having a smaller groove width than a groove width of the at least three circumferential main grooves and extending in the tire circumferential direction is provided in the region of the intermediate land portion and the region of the inner land portion.

8. The pneumatic tire according to claim 1, wherein ranges in the tire circumferential direction of the two extension lines adjacent in the tire circumferential direction do not overlap.

9. The pneumatic tire according to claim 1, wherein a first side, with respect to a tire equator line, in the tire width direction in which the first circumferential main groove is located corresponds to a vehicle mounting outer side in a case where the pneumatic tire is mounted on a vehicle.

10. The pneumatic tire according to claim 1, wherein the tread pattern further comprises a fourth circumferential main groove provided in a second side, with respect to the tire equator line, opposite to a first side in the tire width direction in which the first circumferential main groove is located, the fourth circumferential main groove located on an outer side of the third circumferential main groove in the tire width direction, and extending in the tire circumferential direction,
assuming that the intermediate land portion is referred to as a first intermediate land portion, a second intermediate land portion is located between the third circumferential main groove and the fourth circumferential main groove, and in a region of the second intermediate land portion, a circumferential narrow groove having a smaller groove width than a groove width of each of the circumferential main grooves and extending in the tire circumferential direction is provided.

11. The pneumatic tire according to claim 10, wherein the tread pattern further comprises
a plurality of third intermediate lug grooves provided in the region of the second intermediate land portion and extending from the fourth circumferential main groove toward the circumferential narrow groove and being closed without reaching the circumferential narrow groove, the third intermediate lug grooves being disposed at intervals in the tire circumferential direction, and
a plurality of sipes provided in the region of the second intermediate land portion, and connecting a closed end of each of the third intermediate lug grooves and the circumferential narrow groove in the region of the second intermediate land portion, the sipes being disposed at intervals in the tire circumferential direction.

12. The pneumatic tire according to claim 11, wherein the third intermediate lug grooves and the sipes connected to one another include, as siped lug grooves,
a first siped lug groove extending while bending with an extension direction of each of the third intermediate lug grooves differing from an extension direction of each of the sipes, and
a second siped lug groove extending linearly with the extension direction of each of the third intermediate lug grooves aligning with the extension direction of each of the sipes.

13. The pneumatic tire according to claim 11, wherein a range of each of the third intermediate lug grooves along the tire circumferential direction does not overlap with a range of each of the inner lug grooves along the tire circumferential direction.

14. The pneumatic tire according to claim 1, wherein the extension lines overlap with the first intermediate lug grooves at entire lengths in the tire width direction of the first intermediate lug grooves.

15. The pneumatic tire according to claim 1, wherein a groove width of each of the lug grooves is equal to or more than 2.0 mm.

16. The pneumatic tire according to claim 1, wherein magnitudes of an inclination angle of the extension lines with respect to the tire width direction are from 10 to 30 degrees.

17. The pneumatic tire according to claim 1, wherein the smaller angle of the angles formed at the closed end of each of the shoulder lug grooves between the inclination direction of the main groove side portion and the inclination direction of each of the extension lines is equal to or less than 5 degrees, and the smaller angle of the angles formed at the closed end of each of the closed ends of the inner lug grooves between the inclination direction of the inner lug groove and the inclination direction of each of the extension lines is equal to or less than 5 degrees.

18. The pneumatic tire according to claim 1, wherein the inner lug grooves, the first intermediate lug grooves and the second intermediate lug grooves extend in straight lines.

19. The pneumatic tire according to claim 1, wherein differences in inclination angles between the inner lug grooves, the first intermediate lug grooves, and the second intermediate lug grooves are up to 5 degrees.

20. The pneumatic tire according to claim 1, wherein the first intermediate lug grooves overlap along an entire length thereof with the extension lines.

* * * * *